(12) United States Patent
Kadar-Kallen

(10) Patent No.: US 9,417,408 B2
(45) Date of Patent: Aug. 16, 2016

(54) MODULARIZED INTERPOSER

(75) Inventor: Michael Aaron Kadar-Kallen, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 323 days.

(21) Appl. No.: 13/410,898

(22) Filed: Mar. 2, 2012

(65) Prior Publication Data

US 2013/0230280 A1 Sep. 5, 2013

(51) Int. Cl.
*G02B 6/32* (2006.01)
*G02B 6/42* (2006.01)

(52) U.S. Cl.
CPC .......... *G02B 6/4204* (2013.01); *G02B 6/4214* (2013.01); *G02B 6/4249* (2013.01); *G02B 6/4292* (2013.01)

(58) Field of Classification Search
CPC .................................. G02B 6/32; G02B 6/00
USPC ..................................... 385/33, 16
See application file for complete search history.

(56) References Cited

U.S. PATENT DOCUMENTS

| 4,945,400 | A | 7/1990 | Blonder et al. | |
|---|---|---|---|---|
| 7,063,467 | B2 * | 6/2006 | Nagasaka et al. | 385/88 |
| 7,070,339 | B2 * | 7/2006 | Nagasaka et al. | 385/88 |
| 7,104,703 | B2 * | 9/2006 | Nagasaka et al. | 385/88 |
| 7,118,293 | B2 * | 10/2006 | Nagasaka et al. | 385/89 |
| 7,210,861 | B2 * | 5/2007 | Nagasaka et al. | 385/88 |
| 2004/0017977 | A1 * | 1/2004 | Lam et al. | 385/49 |
| 2004/0028349 | A1 * | 2/2004 | Nagasaka et al. | 385/88 |
| 2004/0202477 | A1 * | 10/2004 | Nagasaka et al. | 398/138 |
| 2004/0234210 | A1 * | 11/2004 | Nagasaka et al. | 385/88 |
| 2004/0252951 | A1 * | 12/2004 | Nagasaka et al. | 385/88 |
| 2005/0238294 | A1 * | 10/2005 | Nagasaka et al. | 385/88 |
| 2006/0104576 | A1 | 5/2006 | Nagasaka | |
| 2006/0159405 | A1 | 7/2006 | Yajima | |
| 2006/0165415 | A1 * | 7/2006 | Nagasaka et al. | 398/116 |
| 2007/0081762 | A1 * | 4/2007 | Sugiyama et al. | 385/18 |
| 2008/0226228 | A1 | 9/2008 | Tamura et al. | |
| 2010/0061683 | A1 | 3/2010 | Sasaki | |
| 2011/0064358 | A1 | 3/2011 | Nishimura | |

FOREIGN PATENT DOCUMENTS

| DE | 4436204 C1 | 3/1996 |
|---|---|---|
| EP | 1447695 A2 | 8/2004 |
| JP | 2008041770 A | 2/2008 |

OTHER PUBLICATIONS

International Search Report, International Application No. PCT/US2013/028581, International Filing Date Mar. 1, 2013.

* cited by examiner

*Primary Examiner* — Kaveh C Kianni

(57) ABSTRACT

An interposer for optically coupling an optical device (OD) to a fiber, the OD mounted on a substrate, the interposer comprising: (a) a lens component comprising at least one lens for optically coupling with the OD the lens having a first optical axis, a first surface for mating with the substrate, and a second surface for mating with a third surface of a fiber component; (b) the fiber component comprising the third surface and a cavity for receiving at least one fiber and holding the fiber along a second optical axis, the first and second optical axes being perpendicular; and (c) wherein at least one of the lens component or the fiber component comprises a reflective surface for optically coupling the lens to a point along the second optical axis and adjacent the cavity.

23 Claims, 5 Drawing Sheets

MODULARIZED INTERPOSER

FIELD OF INVENTION

The present invention relates, generally, to an optical coupling between optical components and waveguides/fibers and, more specifically, to an interposer for active cable assemblies for optically coupling optoelectric devices to fibers.

BACKGROUND OF INVENTION

Active cable assemblies are gaining in popularity as a way of exploiting the broad bandwidth capability of optical fiber. As used herein, an active cable assembly is an optical cable in which the circuitry for converting between electrical and optical is on either side of the optical cable. Thus, the electrical to optical conversion is performed within the cable assembly itself. Significant performance improvements especially with respect to maximum cable length maybe achieved using an active cable assembly.

A critical component of an active cable assembly is the interposer, which optically couples an opto-electric device (OED) to a fiber in the cable assembly. Generally, although not necessarily, the axis of the OED and that of the fiber tend to be perpendicular. Thus, the interposer serves not only to optically couple the OED and the fiber, but also to bend the light to effect the coupling.

Referring to FIG. 12, a schematic of a state-of-art interposer 1200 is shown. An array of OEDs 1207 such as VCSELs or photodiodes is mounted to a substrate 1201. The OEDs in this embodiment are mounted on the side opposite surface 1201a of the substrate to which the interposer 1200 is connected. In such an embodiment, the substrate is optically transparent such that light is transmitted through the substrate. A typical substrate is a glass plate. The glass plate is relatively thin, for example, 0.5 mm thick. To effect optical coupling with the OEDs, the interposer comprises an array of lenses 1204. The lenses 1204 are defined by an air space 1211 between the lens surface and the glass plate. The reflective surface 1209 turns the light at 90 degrees between the lenses 1204 and the fiber 1210.

The interposer 1300 shown in FIG. 13 is an improvement to interposer 1200 in that it comprises a cavity 1330 for receiving a ferrule 1331 containing the optical fiber(s) 1332, rather than just the optical fiber as shown in FIG. 12. The fiber(s) 1332 are held in ferrule 1331 parallel to the substrate 1301. Modularizing the fiber assembly and making it discrete from the interconnection between the OEDs and the lenses of the interposer is a marked improvement over the prior art interposer 1200. In particular, the use of an independent ferrule 1331 allows the fiber assembly to be tested independently of the OED and interposer assembly. Therefore, if problems are detected in the termination of the fibers, the fiber assembly can be reworked rather than scrapping the entire assembly.

Although the interposer 1300 improves the manufacturability of the cable assembly interposer by allowing the cable assembly to be tested independently of the completed interposer, the interposer 1300 still has compound optical alignments as the receptacle must be precisely aligned with the lens in a common assembly. Therefore, Applicant has identified a need for a simpler interposer configuration which eliminates or reduces compound optical couplings. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to an interposer having separate and discrete components for accommodating the lenses and the fibers. Applicant recognizes that configuring an interposer to optically couple lenses and fibers which have perpendicular optical axes involves multiple optical alignments, each compounding the complexity of the interposer. That is, a traditional interposer optically couples the opto-electric devices (OEDs) to lenses and lenses to fibers in a serial fashion. The compound optical couplings increase exponentially the complexity of manufacturing the interposer. By segregating the interposer into a discrete lens component and a discrete fiber component, the compounded optical couplings in a single component can be eliminated, thereby significantly simplifying the components manufacture.

Modularizing the interposer into discrete components also has other benefits depending on the embodiment of the invention. For example, such a configuration lends itself to alignment features that facilitate passive alignment. Specially, in one embodiment in which the reflective surface is defined in the fiber component, the lens component may be passively aligned on the substrate by aligning the lenses over the OEDs because the lenses are not obscured by the reflective surface. Furthermore, in one embodiment, because the optical coupling between the lens/fiber and the OED/lens are split, the components can be molded as parallel layers, making their interface simple and relatively easy to align.

The modular design also facilitates manufacturability. One aspect of the improved manufacturability is the enhanced ability to inspect the molds and the molded components. Specifically, in an embodiment in which the lens and fiber components are parallel, the molds pull from opposing sides, and the critical features (e.g., lenses, fiducials, alignment features) are located on just one side of the mold, thereby making it easier for the mold vendor to inspect the molds, and for the user to inspect the molded pieces. In this respect, the modular design also allows the different components to be tested separately and defects to be detected earlier in the assembly process such that correction action may be taken or the part scrapped without additional investment of manufacturing time and expense.

Yet another benefit of the modular design is the potential for enhanced performance. For example, in one embodiment, the optical beam is expanded in the interposer at the interface between the lens and fiber components, making the beam more robust and less susceptible to dust and slight misalignments.

The modular design also provides for a more robust package. For example, in one embodiment, the area of the lens component can be as large as a glass plate increasing the adhesive bonding force.

Still other benefits will be obvious to one of skill in the art in light of this disclosure.

Accordingly, one aspect of the invention is an interposer having a modular configuration in which the optical couplings between the OEDs/lenses and the lenses/fiber are made in discrete components. In one embodiment, the interposer is adapted for optically coupling an optical device (OD) to a fiber, the OD being mounted on a substrate, the interposer comprising: (a) a lens component comprising at least one lens for optically coupling with the OD the lens having a first optical axis, a first surface for mating with the substrate, and a second surface for mating with a third surface of a fiber component; (b) the fiber component comprising the third surface and a cavity for receiving at least one fiber and holding the fiber along a second optical axis, the first and second optical axes being perpendicular; and (c) wherein at least one of the lens component or the fiber component comprises a reflective surface for optically coupling the lens to a point along the second optical axis and adjacent the cavity.

DESCRIPTION OF DRAWINGS

FIG. 10 shows the lens component having thicker edges, giving more material for the spring clip to latch on to.

DETAILED DESCRIPTION

Figure 1:
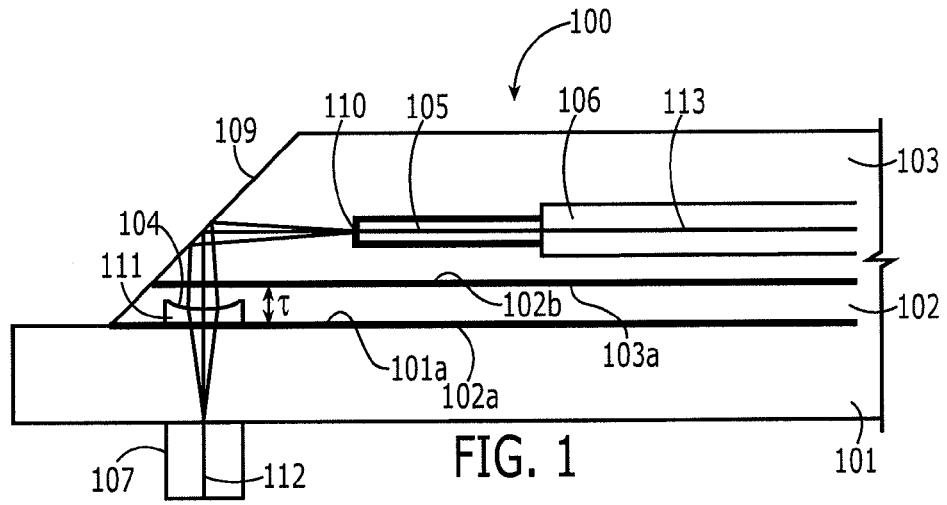
FIG. 1 shows a lens bonded to the glass plate and a fiber and turning ray that are part of a second molded piece that is attached to the lens.

Referring to FIG. 1, one embodiment of the interposer 100 of the present invention is shown. As shown, the interposer 100 optically couples the optical device 107 to a fiber 106. The optical device 107 is mounted on a substrate 101. The interposer comprises a lens component 102 comprising at least one lens 104 defined by a cavity 111 for optically coupling with the OED 107. The lens has a first optical axis 112 essentially perpendicular to the substrate 101. The lens component 102 also has first surface 102a for mating with a top surface 101a of the substrate 101, and a second surface 102b for mating with a third surface 103a of a fiber component 103. The fiber component 103 comprises the third surface 103a and a cavity 105 for receiving at least one fiber 106 and holding the fiber along a second optical axis 113. The first and second optical axes are essentially perpendicular. At least one of the lens component 102 or the fiber component 102 comprises a reflective surface 109 for optically coupling the lens 104 and a point 110 in the fiber component along the second optical axis 113 and adjacent the cavity 105. Below different embodiments of the present invention are considered in greater detail.

Although this invention is described in detail with respect to active cable assemblies, this is just for illustrative purposes, and it should be understood that the invention may be practiced in a variety of applications involving optical coupling, including, for example, optical coupling between a chip and another chip, or between a chip and a backplane, midplane, board-to-board or panel mount connector. The invention can also be used to couple light into waveguides.

The OD may be any known component that affects light. The OD may be for example (a) a passive component, which does not convert optical energy to another form and which does not change state (e.g., fiber, lens, add/drop filters, arrayed waveguide gratings (AWGs), GRIN lens, splitters/couplers, planar waveguides, or attenuators); (b) an optoelectric device (OED) which converts between optical energy and electrical energy (e.g., lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); or (c) a hybrid device which does not convert optical energy to another form but which changes state in response to a control signal (e.g., switches, modulators, attenuators, and tunable filters). It should also be understood that the optical component may be a single discrete device or it may be assembled or integrated as an array of devices.

In the embodiment of FIG. 1, the first surface 102a of the lens component 102 is bonded to the substrate 101, which in this embodiment is a glass plate. It is worthwhile to note that the parallel design of the components 102, 103 provides large surface for bonding to the substrate 101. Indeed, the area lens component can be as large as the substrate to increase the adhesive bonding force. Furthermore, the first and second surfaces 102a, 102b of the lens component 102 are parallel such that the fiber component 103 is also mounted parallel to substrate 101. In this embodiment, the reflective surface 109 is defined in the fiber component 103. In this embodiment the thickness t of lens component 102 is relatively thin, thus, the diameter of the beam of the light at the second surface 102b is nearly at its maximum, making this design robust and less susceptible to dust.

Figure 2:
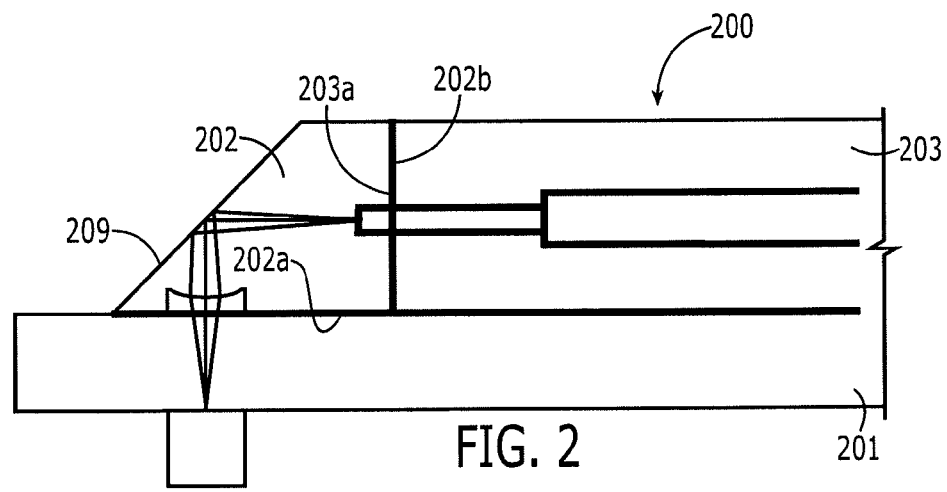
FIG. 2 shows one component that holds the fiber and another component that contains the lens in the mirror in which both components are bonded to the glass plate.

Referring to FIG. 2, the interposer 200 comprises a substrate 201 upon which is mounted a lens component 202 in which the first surface 202a is essentially perpendicular to the second surface 202b. Unlike the embodiment of FIG. 1, in this embodiment, the fiber component 203 mounts directly to the substrate 201 such that its third surface 203a is perpendicular to the substrate 201. In this embodiment, the reflective surface 209 is formed in the lens component 202. One advantage of this configuration is that the two components are thicker than those of FIG. 1 while achieving the identical function. (FIG. 3, discussed below, also shows thicker components, but in a different configuration.)

Figure 3:
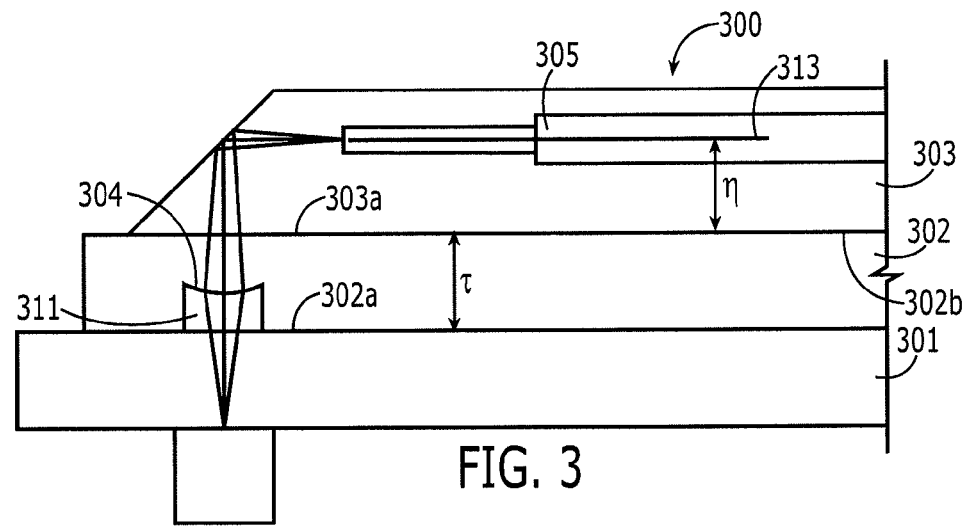
FIG. 3 shows the concept in FIG. 1 but with a thicker lens component for manufacturability.

Referring to FIG. 3, a more robust embodiment of the interposer of FIG. 1 is shown. More specifically, as mentioned above, the lens component 102 of FIG. 1 is relatively thin, e.g. less than 0.5 mm thick, which does not lend itself to manufacturability. In contrast, in the embodiment of FIG. 3, the distance t of the lens component 302 from the first surface 302a to the second surface 302b to is thicker, for example 0.5 mm, facilitating manufacturability. In this particular design, the cavity 305 is configured in the fiber component 303 such that the second optical axis 313 is a distance h from the third surface 303a which, in one embodiment, is essentially the same distance as distance t of the lens component.

As can be seen in the embodiment of FIGS. 1 and 3, the thickness of the two molded components can be controlled by adjusting the location of the lens within the lens component and the position of the fiber. In this regard, a cavity 311 defines the surface of the lens 304. This cavity 311 can be configured on different sides of the lens component depending upon the application. For example, referring to FIG. 3, the cavity 311 is on the first surface 302*a* of the lens component.

Figure 4:
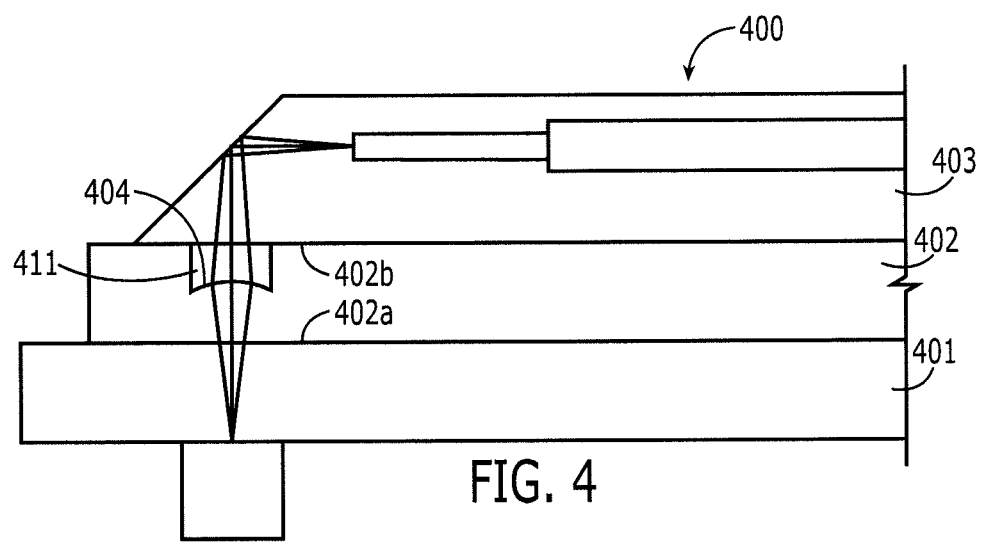
FIG. 4 shows the same concept as in FIG. 3 except the lens surface is on the upper surface of the lens component.

Conversely, as shown in FIG. 4, the cavity 411 is defined in the second surface 402*b* of the lens component 402. Specifically, in this embodiment, the interposer 400 comprises a substrate 401, the lens component 402 and a fiber component 403 in essentially the same configuration as that of FIGS. 1 and 3. However, the cavity 411 is defined in the second surface 402*b* of the lens component as shown, and not the first surface 402*a*. Thus, instead of having a convex portion of the lens facing downward as shown in FIG. 3, the convex portion of the lens 404 faces upward as shown in FIG. 4.

The convex surface of the lens may face up or down depending on the application. For example, one advantage of having the cavity on the bottom of the component as shown in FIG. 3 is that tends not to accumulate dust and debris. On the other hand, the configuration of FIG. 3 is susceptible to adhesive fouling issues in the sense that that lens 304 of the interposer 300 needs to be recessed enough that the adhesive used to bond the lens component to the glass plate does not interfere with the optical path.

Figure 5:
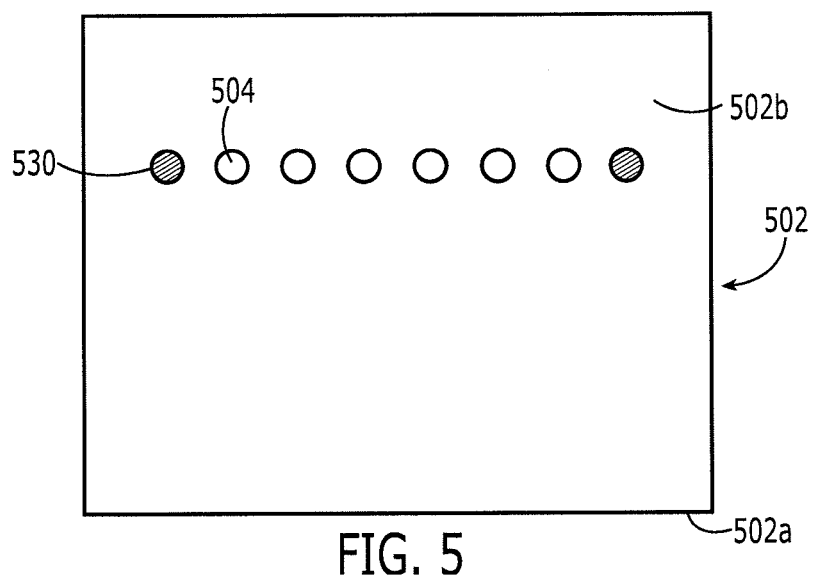
FIG. 5 shows a top view of the lens component in which the locations of the alignment features and lenses can be observed.

As mentioned above, a key feature of having a separable lens and fiber component is the ability to view and create critical alignment features. Specifically, referring to FIG. 5, a lens component 502 is viewed from the second surface 502*b* through the first surface 502*a* (beneath). As shown, the lens portion comprises a series of lenses 504 defined in either the first surface 502*a* (as shown in FIG. 3) or the top surface 502*b* (as shown in FIG. 4). Also shown in FIG. 5 are a number of alignment features 530. Because there is no mirror or fiber cavity to interfere with the optical path, the alignment features and the lenses are easily viewed from the top or bottom of the lens component 502.

Figure 6:
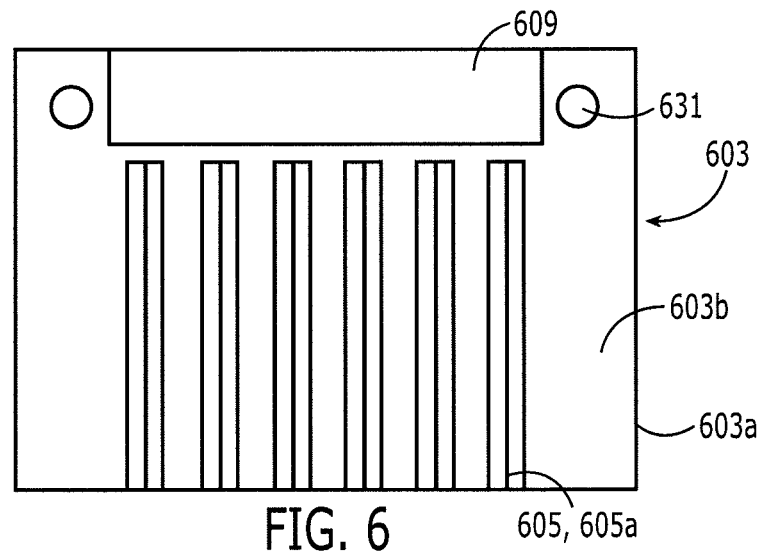
FIG. 6 shows a top view of the fiber component in which the alignment features and the lenses can be observed.

Referring to FIG. 6, the fiber component 603 is shown. This component comprises a reflective surface 609, which is essentially at a 45 degree angle to the third and fourth surfaces 603*a*, 603*b*. The fiber component 603 also comprises alignment features 631 which cooperate with alignment features 530 of the lens component 502. Additionally, a series of fiber cavities 605 are defined in the fiber component 603. In this embodiment, the fiber cavities 605 are a series of V groves 605*a* which have been etched into the top or fourth surface 603*b* as shown.

Figure 7:
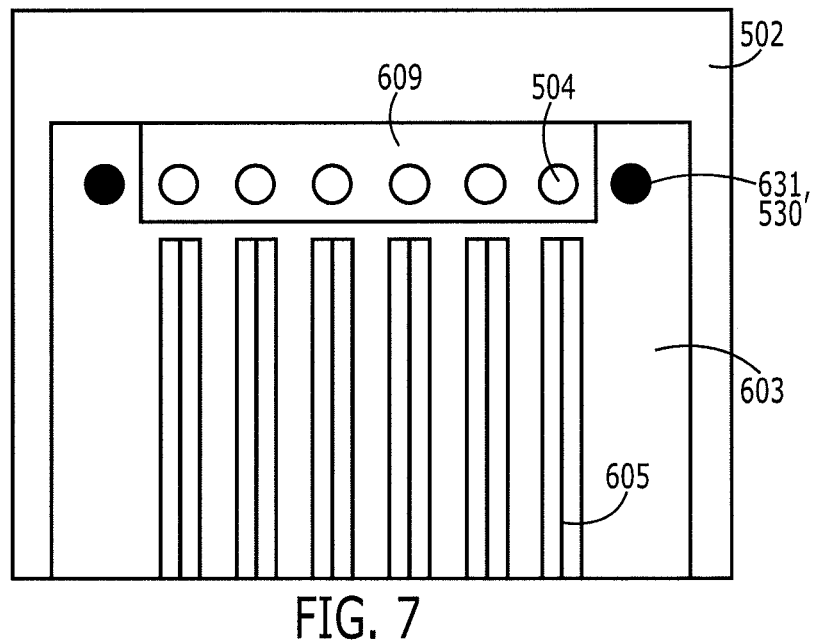
FIG. 7 shows a top view of the lens component of FIG. 5 and the fiber component of FIG. 6 aligned.

Referring to FIG. 7, the combination of the lens component 502 and the fiber component 603 is shown in which the fiber component 603 is disposed on top of the lens component 502 such that the alignment features 631 and 530 are aligned. It should be understood that, although the lenses 504 are shown through the fiber component 603, ordinarily these would not be viewable because of the reflective surface 609, which would reflect their image perpendicular to the further surface and parallel to the fiber cavity 605.

As mentioned above, the separable lens and fiber components have a number of advantages. In particular, the mold used to create the lens component may contain pins for defining alignment holes. Although pins may have a shape that is difficult to manufacture, the position of these pins relative to each other and relative to the alignment features is relatively easy to achieve since the lenses and the alignment features can be inspected in one view. In one embodiment, however, the mold for the fiber component may contain an angled mirror which must be accurately positioned in three dimensions with respect to the fiber grooves and alignment features.

Therefore, in one embodiment, alignment holes are used in the fiber component and alignment pins are used in the lens component. Alternatively, alignment holes can be made in both the lens component and the fiber component, and pins can be used to align the two molded pieces. This adds costs, and requires a manipulation of various small components. Still other approaches for aligning the discrete lens and fiber components will be know to those of skill in the art in light of this disclosure.

Figure 8:
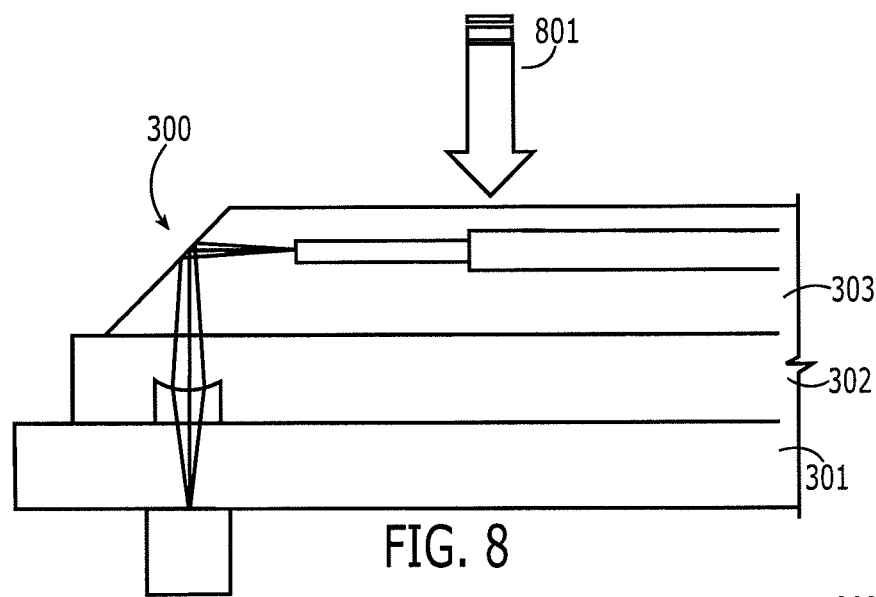
FIG. 8 shows an external force used to mate the fiber component to the lens component.

In one embodiment, as shown in FIG. 8, the lens component 302 is adhered to the substrate 301 and then adhesive is applied between the lens component 302 and the fiber component 303, and an external force 801 is applied to the stack while the adhesive is curing.

Figure 9:
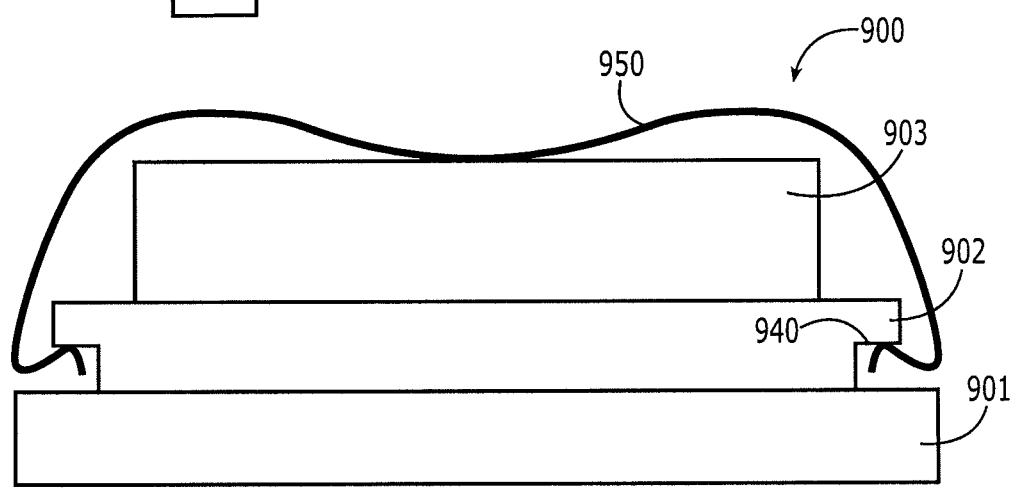
FIG. 9 shows an added feature to the lens component which enables a spring clamp to hold the fiber component against the lens component.

Rather than using adhesive, it may be preferable to use a mechanical clip or other kind of mechanical device to hold the components together. In one embodiment, features are added to the edge of the lens component to facilitate interengagement with a resilient mechanical clip. For example, referring to FIG. 9, an interposer 900 is shown in which a lens component 902 is secured to the substrate 901 using adhesive or other means. Next, the fiber component 903 is disposed over the lens component 902 and a spring clip 950 is disposed over the fiber and lens components. To facilitate the clip's interengagement with the lens component, a ledge 940 is formed at the edge of the lens component. In this embodiment, the ledge 940 is molded with the lens component 902 as shown. The clip is biased such that it urges the fiber component into the lens component as shown.

Figure 10:
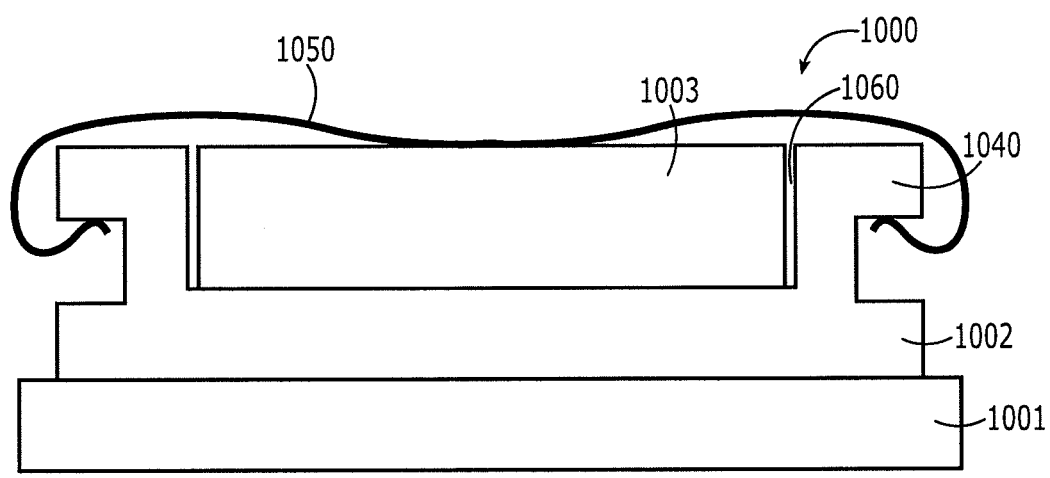

In certain circumstances, the edge of the lens component 902 may be too thin to accommodate the ledge 940. It should be understood, however, that the thickness of the lens component at its edges need not be the same as the thickness in the middle portion where the lens are defined. Rather, the edge of the lens component may be much thicker to accommodate a ledge or similar mechanical interengagement. For example, referring to FIG. 10, an interposer 1000 is shown in which a lens component 1002 is adhesively secured to a glass plate 1001. In this case, the edges 1040 extend upward and are much thicker than the middle portion of the lens component where the lenses are located. In addition to making the edge 1040 more robust as shown, such a configuration also defines a cavity 1060 for receiving the fiber component 1003 as shown. The spring clip 1050 functions to secure the fiber component by urging it into the lens component.

Figure 11:
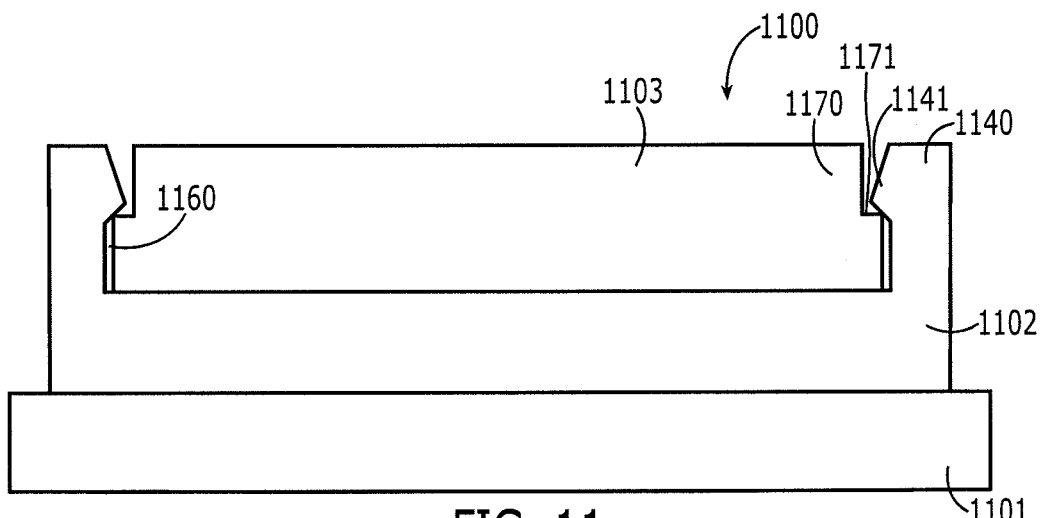
FIG. 11 shows the lens component having latches that clip on to the feature of the fiber component.
Figure 12:
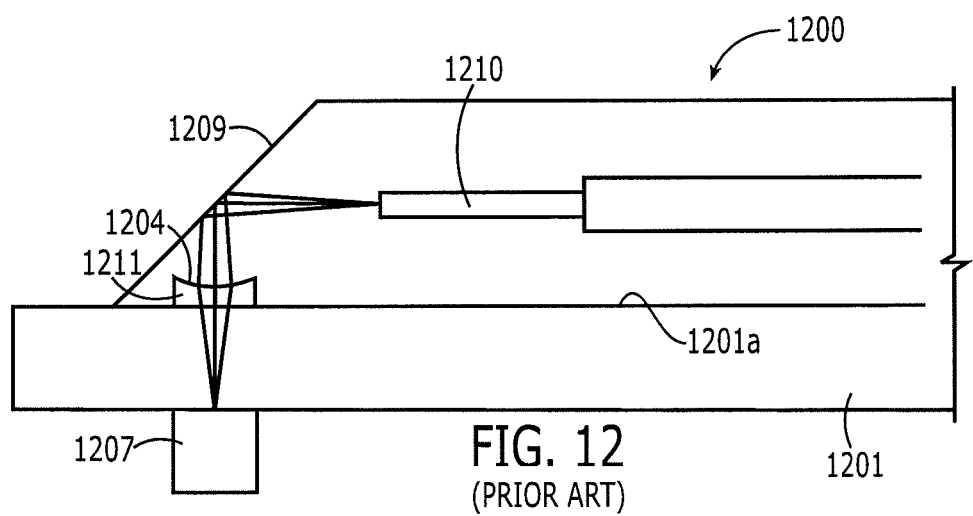
FIG. 12 shows a schematic of a state-of-art interposer.
Figure 13:
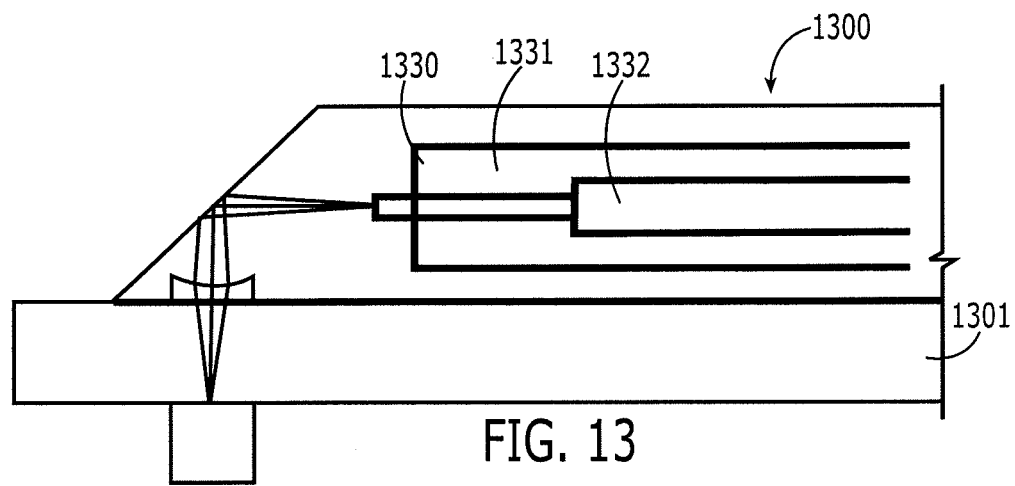
FIG. 13 shows an improvement to FIG. 12 in which the fiber is held in a discrete ferrule.

In another embodiment, the lens component is configured with resilient latches that snap onto the fiber component to hold it securely. For example, referring to FIG. 11, the interposer 1100 comprises a substrate 1101 upon which is adhered a lens component 1102. The lens component comprises an edge 1140 that extends upward forming a compliant latch 1141. The compliance of the latch is derived from it being a cantileved beam extending from the body of the lens component. The latch 1141 is adapted to cooperate with a shoulder 1171 defined on an edge 1170 of the fiber component 1103. Thus, in this embodiment, the compliant latch 1141 is deflected outward as fiber component 1103 is inserted into the cavity 1160 of the lens component 1103. Once the shoulder 1171 is below the latch 1141, latches 1141 snap back, interengaging with the shoulder 1171 and securing the fiber component 1103 to the lens component. Although this configuration adds complexity to the mold, it simplifies the assembly and minimizes height of the assembly.

Rather than using the downward force of the fiber component to wedge open the latches as described above, in one embodiment, features are added to the latches to allow them to easily spread open using a tool or the latches can extend such that they protrude above the surface of the fiber component.

It should be understood that the description above provides illustrative embodiments of the present invention and other embodiments exist.

What is claimed is:

1. An interposer for optically coupling an optical device (OD) to a fiber, said OD mounted on a substrate, said interposer comprising:
   a lens component comprising at least one lens for optically coupling with said OD mounted to said substrate, said lens having a first optical axis, said lens component also comprising a planar first surface for mating with said substrate such that at least a portion of said first surface contacts said substrate on which said OD is mounted, and a planar second surface for mating with a planar third surface of a fiber component, said first and second surfaces being parallel, said first optical axis passing through said first and second surfaces;
   said fiber component comprising said third surface and a cavity for receiving at least one fiber and holding said fiber along a second optical axis, said third surface being parallel with said first and second surfaces, said first and second optical axes being perpendicular, said fiber component also comprising a reflective surface for reflecting light between said lens and a point, which is along said second optical axis and adjacent said cavity, wherein said fiber component is stacked on said lens component, and wherein no portion of said fiber component contacts said substrate.

2. The interposer of claim 1, wherein said lens is defined by a lens cavity in said lens component.

3. The interposer of claim 2, wherein said lens cavity is on the bottom of said lens component.

4. The interposer of claim 2, wherein said lens cavity is on the top of said lens component.

5. The interposer of claim 1, wherein said lens component is greater than 0.5 mm thick.

6. The interposer of claim 1, wherein the distance between said lens and said second surface is less than the distance between said reflective surface and said point.

7. The interposer of claim 1, further comprising a second lens at said point.

8. The interposer of claim 1, wherein said lens component comprises at least one alignment feature for positioning said lens component on said substrate, said alignment feature being observable when viewing said lens component parallel to said first optical axis.

9. The interposer of claim 8, wherein said alignment feature comprises two features, one on each side of said at least one lens.

10. The interposer of claim 1, wherein said fiber component comprises at least one alignment feature for aligning said fiber component on said lens component.

11. The interposer of claim 10, wherein said at least one alignment feature comprise two alignment holes, said alignment holes being adapted to receive alignment pins disposed in said lens component.

12. The interposer of claim 1, wherein said cavity is a V-groove.

13. The interposer of claim 1, wherein said cavity is configured to receive a ferrule containing said fiber.

14. The interposer of claim 1, wherein said cavity is configured to receive a bare fiber.

15. The interposer of claim 1, wherein said first, second and third surfaces are parallel to said substrate.

16. The interposer of claim 1, wherein said fiber component has a top planar surface parallel to said third surface.

17. The interposer of claim 1, wherein said OD comprises an opto-electric device.

18. AnT4e interposer for optically coupling an optical device (OD) to a fiber, said OD mounted on a substrate, said interposer comprising:
   a lens component comprising at least one lens for optically coupling with said OD mounted to said substrate, said lens having a first optical axis, said lens component also comprising a planar first surface for mating with said substrate such that at least a portion of said first surface contacts said substrate on which said OD is mounted, and a planar second surface for mating with a planar third surface of a fiber component, said first and second surfaces being parallel, said first optical axis passing through said first and second surfaces;
   said fiber component comprising said third surface and a cavity for receiving at least one fiber and holding said fiber along a second optical axis, said third surface being parallel with said first and second surfaces, said first and second optical axes being perpendicular, said fiber component also comprising a reflective surface for reflecting light between said lens and a point, which is along said second optical axis and adjacent said cavity, wherein said fiber component comprises at least one alignment feature for aligning said fiber component on said lens component, wherein said at least one alignment feature comprise two alignment holes, said alignment holes being adapted to receive alignment pins disposed in said lens component, and wherein said lens component comprises second alignment features which cooperate with said alignment holes of said fiber component to align said lens component with said fiber component.

19. The interposer of claim 18, wherein said second alignment features comprise alignment holes.

20. The interposer of claim 18, wherein said fiber component is stacked on said lens component.

21. The interposer of claim 15, wherein no portion of said fiber component contacts said substrate.

22. An interposer for optically coupling an optical device (OD) to a fiber, said OD mounted on a substrate, said interposer comprising:
   a lens component comprising at least one lens for optically coupling with said OD mounted to said substrate, said lens having a first optical axis, said lens component also comprising a planar first surface, at least a portion of which contacts said substrate, and a planar second surface for mating with a planar third surface of a fiber component, said first and second surfaces being parallel, said first optical axis passing through said first and second surfaces;
   said fiber component comprising said third surface and a cavity for receiving at least one fiber and holding said fiber along a second optical axis, said third surface being parallel with said first and second surfaces, said first and second optical axes being perpendicular, said fiber component also comprising a reflective surface for reflecting light between said lens and a point, which is along said second optical axis and adjacent said cavity, wherein said fiber component is stacked on said lens component, and wherein no portion of said fiber component contacts said substrate.

23. The interposer of claim 22, wherein said OD comprises an opto-electric device.

* * * * *